United States Patent
Allen et al.

(10) Patent No.: US 9,412,398 B2
(45) Date of Patent: Aug. 9, 2016

(54) SHIELD WITH UNIFORM MAGNETIC PROPERTIES FOR A PERPENDICULAR MAGNETIC RECORDING HEAD

(71) Applicant: HGST Netherlands B.V., Amsterdam (NL)

(72) Inventors: Donald G. Allen, Morgan Hill, CA (US); Wen-Chien D. Hsiao, San Jose, CA (US); Quan-chiu H. Lam, San Jose, CA (US); Ning Shi, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 203 days.

(21) Appl. No.: 13/972,709

(22) Filed: Aug. 21, 2013

(65) Prior Publication Data
US 2015/0056473 A1    Feb. 26, 2015

(51) Int. Cl.
*G11B 5/31* (2006.01)
(52) U.S. Cl.
CPC ............ *G11B 5/3163* (2013.01); *G11B 5/3116* (2013.01); *Y10T 428/1186* (2015.01)
(58) Field of Classification Search
CPC .... G11B 5/3163; G11B 5/3116; G11B 5/232; G11B 5/10; G11B 5/23; G11B 5/235
USPC ........................................ 360/119.01–119.04
See application file for complete search history.

(56) References Cited

U.S. PATENT DOCUMENTS

| | | | |
|---|---|---|---|
| 4,488,195 A * | 12/1984 | Yanagiuchi et al. ..... | 360/125.01 |
| 6,650,512 B1 | 11/2003 | Gill | |
| 7,228,619 B2 | 6/2007 | Le | |
| 7,239,478 B1 * | 7/2007 | Sin et al. ..................... | 360/125.3 |
| 7,248,431 B1 * | 7/2007 | Liu et al. ................... | 360/119.02 |
| 7,293,344 B2 | 11/2007 | Han et al. | |
| 7,382,577 B2 | 6/2008 | Han et al. | |
| 7,508,630 B2 | 3/2009 | Matono | |
| 7,522,377 B1 | 4/2009 | Jiang et al. | |
| 7,596,855 B2 | 10/2009 | Matono | |
| 7,633,713 B2 | 12/2009 | Chen et al. | |
| 7,712,207 B2 | 5/2010 | Pentek et al. | |
| 7,726,009 B1 * | 6/2010 | Liu et al. ..................... | 29/603.11 |

(Continued)

OTHER PUBLICATIONS

Guan, Lijie et al., A Trailing Shield Perpendicular Writer Design With Tapered Write Gap for High Density Recording, IEEE Transactions on Magnetics, Nov. 2008, vol. 44, Issue 11, IEEE, Piscataway, United States.

(Continued)

*Primary Examiner* — Will J Klimowicz
(74) *Attorney, Agent, or Firm* — Patterson & Sheridan, LLP

(57) ABSTRACT

Depositing a seed layer for a high-moment shield onto a write pole may have a deleterious effect on the magnetic response of the write pole. Instead, an amorphous separation layer may be deposited between the write pole and the seed layer. In one embodiment, the seed layer is formed directly on the amorphous layer. In addition to separating the seed layer from the write pole, the amorphous separation layer permits the seed layer to dictate the crystallographic orientation of the shield which is subsequently deposited on the magnetic head. That is, the amorphous layer provides a substrate that allows the seed layer to have a crystalline structure independent of the layers that were deposited previously. The amorphous separation layer may comprise an amorphous metal—e.g., NiNb or NiTa—or an insulative material—e.g., alumina or silicon dioxide.

20 Claims, 7 Drawing Sheets

(56) References Cited

U.S. PATENT DOCUMENTS

| | | | |
|---|---|---|---|
| 7,748,103 B2 | 7/2010 | Allen et al. | |
| 7,911,737 B1 * | 3/2011 | Jiang et al. | 360/125.12 |
| 7,995,307 B2 | 8/2011 | Zheng | |
| 8,120,874 B2 | 2/2012 | Hsiao et al. | |
| 8,231,796 B1 | 7/2012 | Li et al. | |
| 8,339,734 B2 | 12/2012 | Pentek et al. | |
| 8,400,733 B2 | 3/2013 | Shin et al. | |
| 8,797,686 B1 * | 8/2014 | Bai et al. | 360/125.15 |
| 8,861,133 B1 * | 10/2014 | Si et al. | 360/125.03 |
| 8,861,137 B1 * | 10/2014 | Lam et al. | 360/125.3 |
| 2008/0088972 A1 | 4/2008 | Sasaki et al. | |
| 2008/0180858 A1 | 7/2008 | Ota et al. | |
| 2009/0021868 A1 * | 1/2009 | Takano et al. | 360/315 |
| 2009/0257151 A1 | 10/2009 | Zhang et al. | |
| 2009/0310262 A1 | 12/2009 | Wu et al. | |
| 2010/0007996 A1 * | 1/2010 | Iwasaki et al. | 360/324 |
| 2010/0110585 A1 | 5/2010 | Takano et al. | |
| 2010/0112486 A1 | 5/2010 | Zhang et al. | |
| 2010/0119874 A1 | 5/2010 | Zhang et al. | |
| 2010/0315735 A1 | 12/2010 | Zhou et al. | |
| 2011/0090595 A1 | 4/2011 | Hirata et al. | |
| 2011/0134567 A1 | 6/2011 | Chen et al. | |
| 2012/0026628 A1 | 2/2012 | Li et al. | |
| 2012/0134048 A1 * | 5/2012 | Takeo et al. | 360/110 |
| 2012/0164486 A1 | 6/2012 | Bonhote et al. | |

OTHER PUBLICATIONS

M. Feil et al., Investigation of the Adhesion Mechanism of NiCr Layers on Al2O3 and AlN Substrates, Proceedings of the 41st Electronic Component and Packaging Conference, May 11-16, 1991, Atlanta, GA , USA, pp. 134-140.

* cited by examiner

SHIELD WITH UNIFORM MAGNETIC PROPERTIES FOR A PERPENDICULAR MAGNETIC RECORDING HEAD

BACKGROUND OF THE INVENTION

1. Field of the Invention

Embodiments of the present invention generally relate to fabricating a magnetic head with uniform magnetic properties, and more particularly to forming an amorphous separation layer between a main pole and a shield layer.

2. Description of the Related Art

In general, a write head may consist of a high-moment magnetic core, a shield, and a gap layer located in between the core and shield. Suitable gap layer materials include rhodium (Rh), ruthenium (Ru), iridium (Ir), and platinum (Pt), and/or other platinum metals which are corrosion resistant and have atomic numbers that vary from those of transition metals (e.g., Co and Fe). However, these materials by themselves often have poor adhesion due to chemical inertness. Accordingly, a seed layer may first be deposited to improve adhesion of the primary gap material; however, the selection of an appropriate seed material affects not only the deposited gap layer, but also the downstream fabrication steps.

In some write heads, a top shield is deposited near the gap layer. Potential negative effects between the seed layer and the top shield may change the magnetization behavior of the top shield so that the main pole write field may be unable to predictably write data to a magnetic disk in a disk drive. This negative effect is especially harmful when it is unaccounted for when designed the write head. Accordingly, a write head may be designed to mitigate any negative affects between the materials of the gap and seed layers and the underlying layers.

SUMMARY OF THE INVENTION

One embodiment of the disclosure includes a method for fabricating a magnetic head. The method includes forming a write pole configured to perform perpendicular magnetic recording and forming an amorphous metal layer above the write pole, wherein the metal layer is electrically conductive. After forming the amorphous metal layer, the method includes forming a trailing shield such that the amorphous metal layer is between the trailing shield and the write pole.

Another embodiment presented herein is a magnetic head that includes a write pole configured to perform perpendicular magnetic recording and an amorphous metal layer comprising an electrically conductive material. The head also includes a magnetic trailing shield, where the amorphous metal layer is between the trailing shield and the write pole.

Another embodiment presented herein is a method for fabricating a magnetic head. The method includes forming a write pole configured to perform perpendicular magnetic recording. After forming the write pole, the method includes forming an amorphous layer comprising a material lacking a crystalline structure. After forming the amorphous layer, the method includes forming a seed layer directly contacting the amorphous layer. After forming the seed layer, the method includes forming a trailing shield comprising a magnetic material.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments disclosed herein include separating a main pole in a magnetic head of a disk drive from a seed layer used to grow a high-moment shield with soft magnetic properties. Specifically, a thin separation layer—e.g., less than ten nanometers—may be deposited between the main pole and the seed layer to mitigate any negative effects resulting from the material of the seed layer deposited (i.e., grown) on top of the material of the main pole. To improve the recording, the main pole may be tapered to create a funnel shape by ion milling which exposes the main pole in a sloped area. The exposed surface facilitates seed growth for the shield. In one embodiment, the separation layer is an amorphous metal layer that separates the main pole from the seed layer used to grow the shield layer. As will be discussed in more detail below, the seed layer may have a crystallographic orientation that provides a suitable substrate for growing a high-moment shield layer. In one embodiment, instead of using an amorphous metal layer, an amorphous insulation layer (e.g., alumina or silicon dioxide) may be placed between the main pole and the shield layer. Using an insulation layer as the separation layer, however, may add additional costs to fabricating the write head.

Figure 1:
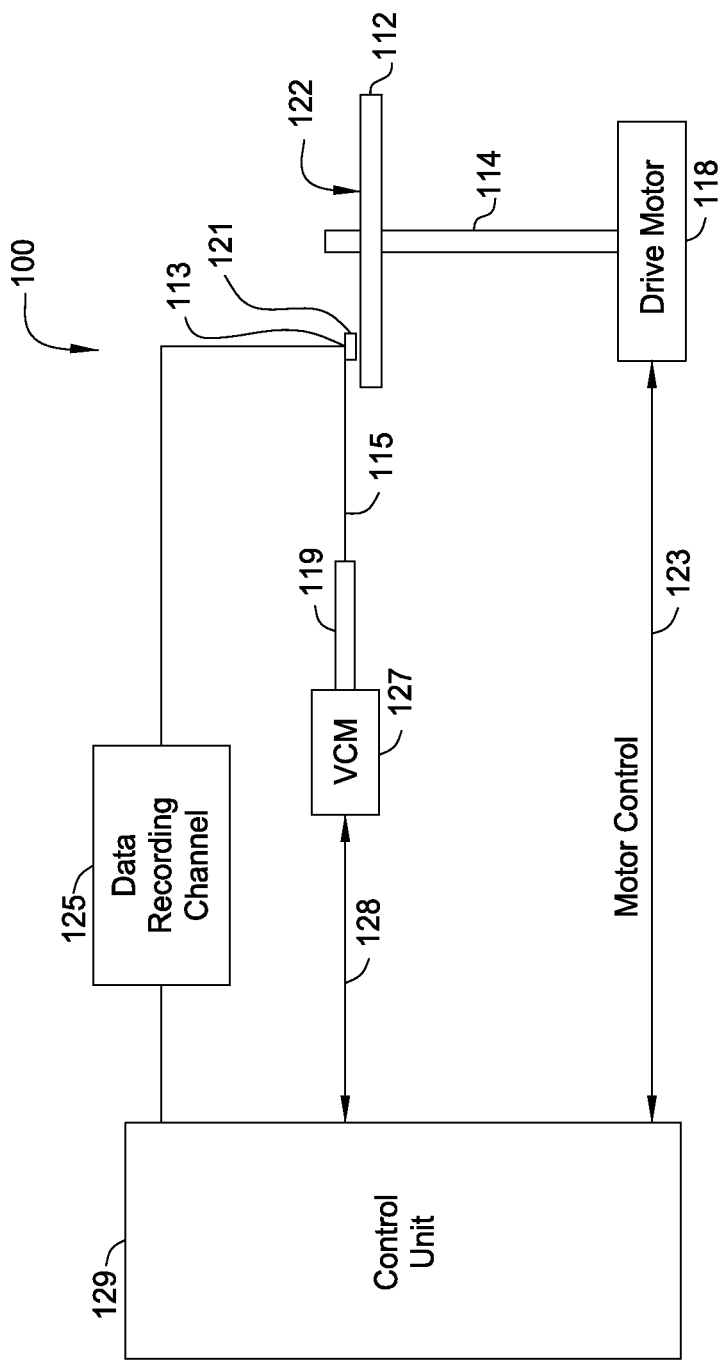
FIG. 1 is a schematic illustration of a disk drive system in which the invention might be embodied, according to one embodiment described herein.

FIG. 1 illustrates a disk drive 100 according to one embodiment disclosed herein. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that, in one embodiment, perform perpendicular magnetic recording (PMR) and include a separation layer as discussed above. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of the disk storage system, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk 112 surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
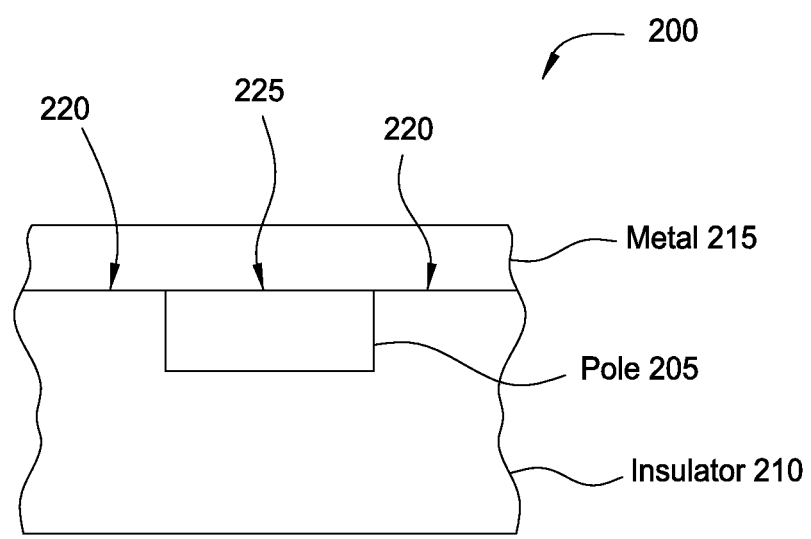
FIG. 2 is a structure illustrating interfaces near a pole in a magnetic writer, according to one embodiment described herein.

FIG. 2 is a structure 200 illustrating interfaces 220, 225 near a pole in a magnetic writer, according to one embodiment described herein. Structure 200 includes a magnetic pole 205 embedded in an insulator 210 (e.g., alumina or silicon dioxide). In one embodiment, the magnetic pole 205 may be used as a main pole for writing data to a magnetic disk when performing PMR. One side of the pole 205 contacts a metal layer 215. Suitable materials of pole 205 may include cobalt, iron, nickel, and combinations thereof. In contrast to insulator 210 which is amorphous (i.e., lacks a crystalline structure), the materials of pole 205 form a crystalline structure (e.g., BCC). Because of the structural difference between the pole 205 and insulator 210, forming the metal layer 215 on top of these materials may result in different effects at the respective interfaces 220, 225. That is, directly forming metal layer 215 on pole 205 as shown by interface 225 may have different effects during magnetic recording when the pole 205 is contact the metal layer 215 than forming metal layer 215 on the amorphous insulators 210 as shown by interface 220.

In one embodiment, metal layer 215 may include a plurality of different metal layers. For example, layer 215 may form a stack that includes a seed layer, gap layer, and shield layer. As will be discussed in more detail below, the material of the seed layer may have a crystallographic orientation that facilitates growth of a high-moment shield layer. As understood by one of ordinary skill in the art, the crystalline properties of the seed layer affect the crystalline properties of the layers deposited on top. Thus, choosing the material of the seed layer affects the crystalline structure of the gap layer and the crystalline structure of the shield layer. This relationship will be discussed in greater detail below.

In another embodiment, unlike that shown in FIG. 2, the main pole 205 of a magnetic writer may be embedded in a non-magnetic, metallic conductor (e.g., Ru or other inert metal) instead of the insulator 210 which is done in, for example, a Damascene process. Regardless of whether the pole 205 is surrounded by an insulator or a metal, the embodiments described herein may still be used to insert an amorphous separation layer.

Figure 3A:
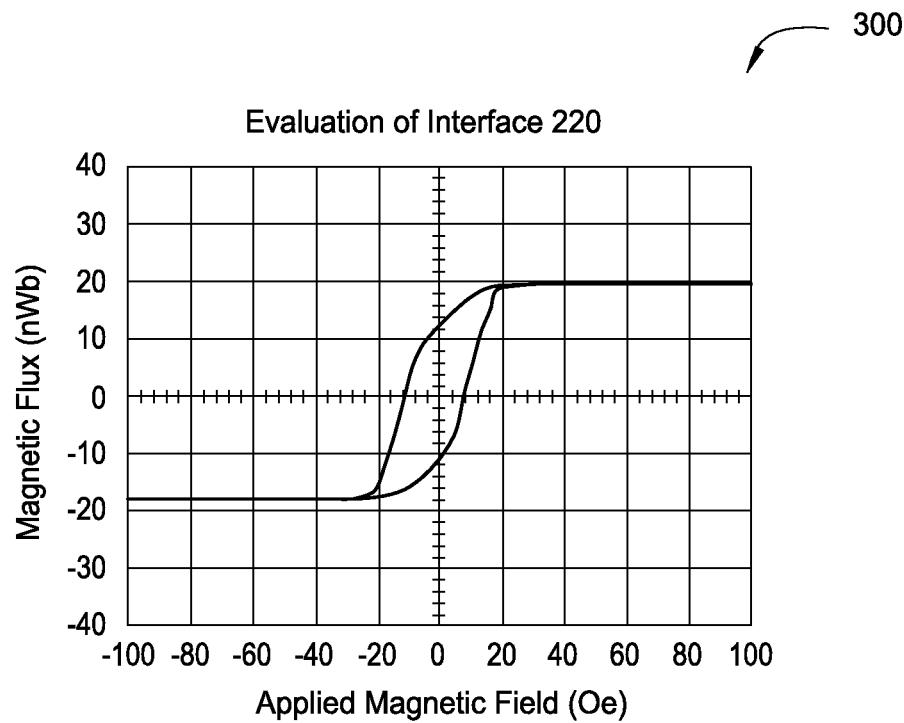
FIGS. 3A-3B are charts illustrating the magnetic response of the interfaces shown in FIG. 2, according to embodiments described herein.
Figure 3B:
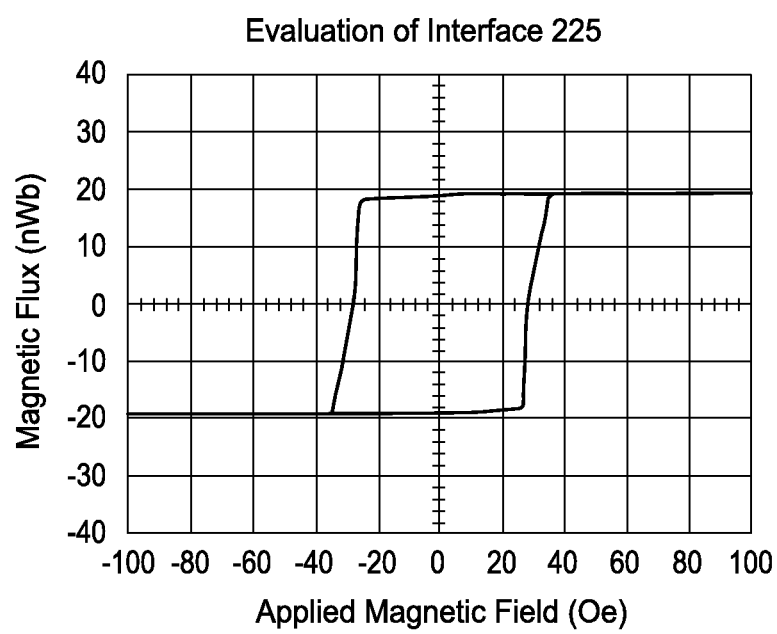

FIGS. 3A-3B are charts illustrating the magnetic response at the interfaces 220 and 225 shown in FIG. 2, according to embodiments described herein. Specifically, FIG. 3A illustrates the magnetic response of depositing metal material onto the insulator (e.g., insulator 210 shown in FIG. 2). Here, the metal material includes a seed layer (e.g., NiCr), a gap layer (e.g., Ru) and a shield layer (e.g., CoFeNi or CoFe). Chart 300 illustrates the magnetic flux relative to the applied magnetic field. As the magnetic field varies, the magnetic flux responds accordingly. That is, as the applied magnetic field returns to zero, the magnetic flux also approaches zero (with some latency). Accordingly, chart 300 illustrates that at the interface 220 between the metal layer 215 (e.g., the NiCr/Ru/CoFeNi stack) and insulator 210 the magnetic response is acceptable. Stated differently, during operation, the magnetic response of the metal layer at interface 220 will substantially correspond to the applied magnetic field with a defined slope. One of ordinary skill will recognize that chart 300 illustrates a write head with a well defined hard axis.

Chart 305 of FIG. 3B illustrates the magnetic response at the interface 225 between the main pole and the NiCr/Ru/CoFeNi stack. Here, the response of the metal lags behind the applied magnetic field. For example, when changing the applied magnetic field from 80 Oe to 0 Oe, the metal stack remains magnetized. As such, even when the magnetic write head is no longer writing (i.e., the applied magnetic field is 0), the metal stack near interface 220 remains magnetized. This magnetized portion of the metal stack may inadvertently change the polarization of the magnetic material in the disk and potentially corrupt the stored data. In addition, the magnetic response shown illustrates that the stack may be an ineffective shield for the pole.

As seen from comparing charts 300 and 305, depositing the metal stack of NiCr/Ru/CoFeNi on a main pole surface may result in unpredictable behavior during operation. To mitigate this behavior, the stack may be separated from the main pole of the magnetic head. The embodiments below describe placing a separation layer made of amorphous material between the main pole and the seed layer to avoid the poor magnetic response shown in chart 305. Although the analytical data in chart 305 is based on the interface between the main pole and a NiCr/Ru/CoFeNi stack, the present embodiments are not limited to such. One of ordinary skill in the art will recognize that an amorphous separation layer may be used to separate the main pole from any crystalline material that may negatively affect the performance of the magnetic head.

Figure 4A:
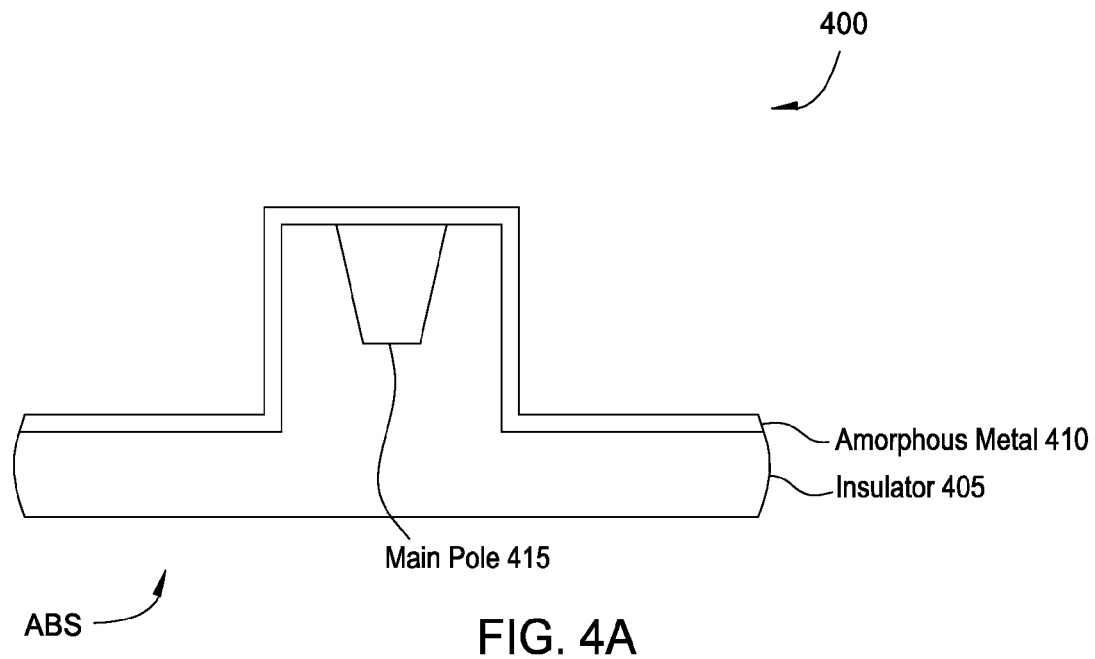
FIGS. 4A-4D illustrate a flow for fabricating a magnetic head with an amorphous metal layer between a main pole and shield, according to embodiments described herein.

FIGS. 4A-4D illustrate a flow for fabricating a magnetic head 400 with an amorphous metal layer between a main pole and shield, according to embodiments described herein. In one embodiment the magnetic head 400 is a portion of the magnetic head assembly 121 for performing PMR as shown in FIG. 1. FIG. 4A illustrates an insulator substrate 405 (e.g., silicon dioxide, alumina, and the like) which includes an embedded main pole 415. Specifically, FIG. 4A may be a view of the air bearing surface (ABS) as seen from a magnetic disk in a disk drive. The main pole 415 may be a high-moment magnetic pole such as cobalt-iron or an alloy thereof, such as CoFeNi. Head 400 may also include a return pole (not shown) for writing data to magnetic media. The embedded main pole with an exposed top surface as in FIG. 4A results from making a tapered main pole by ion milling where the main pole is wider at the ABS than the interior. Instead of depositing a crystalline metal layer onto the main pole 415, an amorphous metal 410 is conformally deposited onto the magnetic head 400. The amorphous metal 410 serves as a separation layer to divide the main pole 415 from later deposited materials. Advantageously, using an electrically conductive amorphous metal as the separation layer may reduce the number of processing steps for fabricating the magnetic head 400 relative to using an insulative separation layer which is discussed in more detail in FIG. 7.

In one embodiment, the amorphous metal 410 includes nickel-niobium (NiNb), Nickel-Tantalum (NiTa), or combinations thereof. In one embodiment, NiNb may comprise 60% nickel and 40% niobium by atomic weight when used as the amorphous metal 410. When NiTa is used, it may include 62.5% nickel and 37.5% tantalum. However, these atomic percentages are only two examples of the amount of the respective elements in metal 410. As such, the atomic percentages may vary so long as the metal layer 410 remains amorphous. In one embodiment, the thickness of the amorphous metal layer 410 may be less than 10 nm, and more specifically, may range from 10 angstroms to 100 angstroms.

NiNb and NiTa are non-limiting examples used to illustrate the effect of amorphous metal in disrupting the unwanted crystalline seeding effect. Other known metal amorphous material is likely to possess similar advantages when used as substitutes. For example, non-magnetic bulk amorphous alloys may be used when deposited as thin films. Other suitable materials include Ni-based non-magnetic alloys such as Ni—Hf and Ni—Zr. Thus, although NiNb and NiTa are discussed in detail herein, other non-magnetic metallic amorphous may have similar effect and within the scope of current disclosure.

Figure 4B:
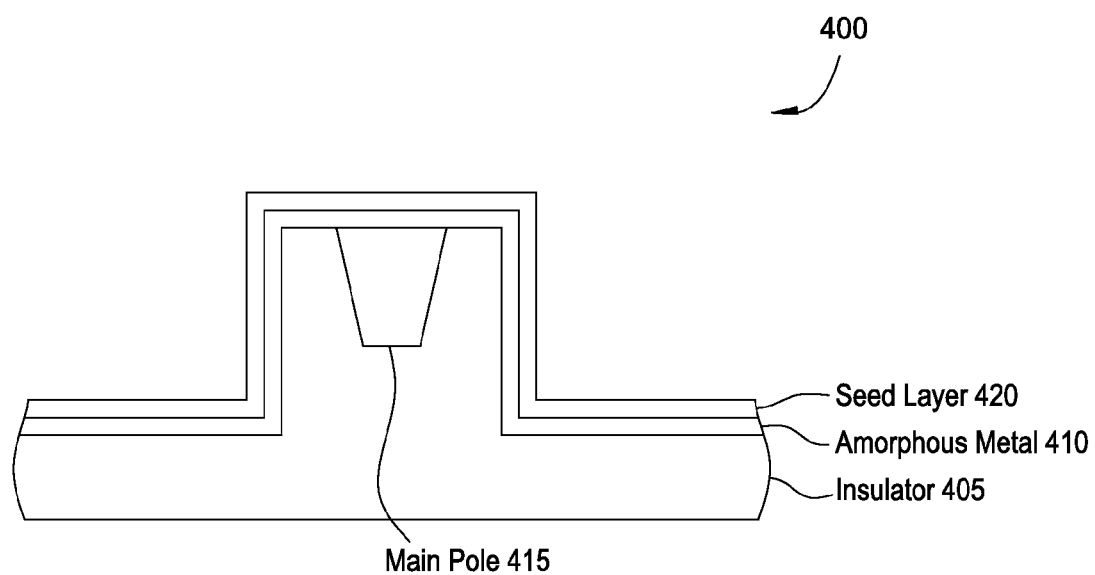

In FIG. 4B a seed layer 420 is formed (e.g., deposited) on top of the amorphous metal 410. In one embodiment, seed layer 420 is used as an adhesion layer between the underlying layers and later deposited layers. The seed layer 420 may include chromium (Cr), tantalum (Ta), or NiCr. The latter material may be preferred because it has a similar etch rate as other materials exposed at the air bearing surface as well as a crystallographic orientation that grows a shield layer with a desirable properties—e.g., soft magnetic properties. This is discussed further in U.S. Patent Application 2012/0164486 entitled "NiCr as a Seed Stack for Film Growth of a Gap Layer Separating a Magnetic Main Pole or Shield" (application Ser. No. 12/975,547) which is herein incorporated by reference. There, a seed layer of NiCr, because of its crystalline structure, is used to grow a high-moment main pole or a shield (e.g., a trailing shield, or more specifically, a wrap-around trailing shield) with soft magnetic properties. Specifically, a NiCr adhesion or seed layer dictates the crystalline structure of a gap layer which in turn dictates the crystalline structure of a shield layer. Although the specific crystal structures of each layer in the stack may be different (because the materials used in each layer are different), the crystalline structure of the seed layer can arrange the material of the shield layer to yield the desired properties if the corresponding materials for the stack are selected. However, the embodiments herein are not limited to the seed layer materials listed herein, but rather, may include any material that oxidizes easily (i.e., is reactive) and is suitable for an adhesion layer. In one embodiment, the thickness of seed layer 420 may be less than 10 nm, and more specifically, may range from 10 angstroms to 100 angstroms.

Figure 4C:
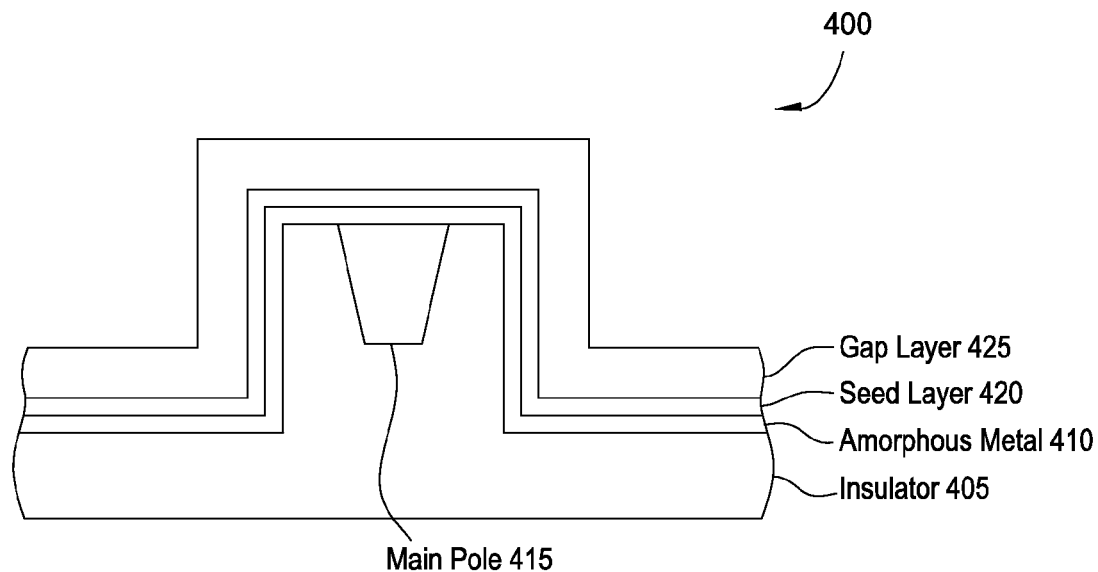

FIG. 4C illustrates depositing a gap layer 425 on top of the seed layer 410 which may be use to form a write head-trailing shield gap. Suitable gap layer materials include rhodium (Rh), ruthenium (Ru), iridium (Ir), and platinum (Pt), and/or other platinum metals which are corrosion resistant and have atomic numbers that vary from those of transition metals (e.g., Co and Fe). Because these materials by themselves often have poor adhesion due to chemical inertness, the seed layer 420 is first deposited to improve adhesion of the primary gap material. Moreover, the crystalline structure of the seed layer 420 may dictate the crystalline structure of the material in the gap layer 425. In one embodiment, the thickness of the gap layer 425 is less than 100 nm. Although amorphous metal 410, seed layer 420, and gap layer 425 are shown as separate layers, in one embodiment, the combination of these layers may be considered as a unified gap layer or stack.

Figure 4D:
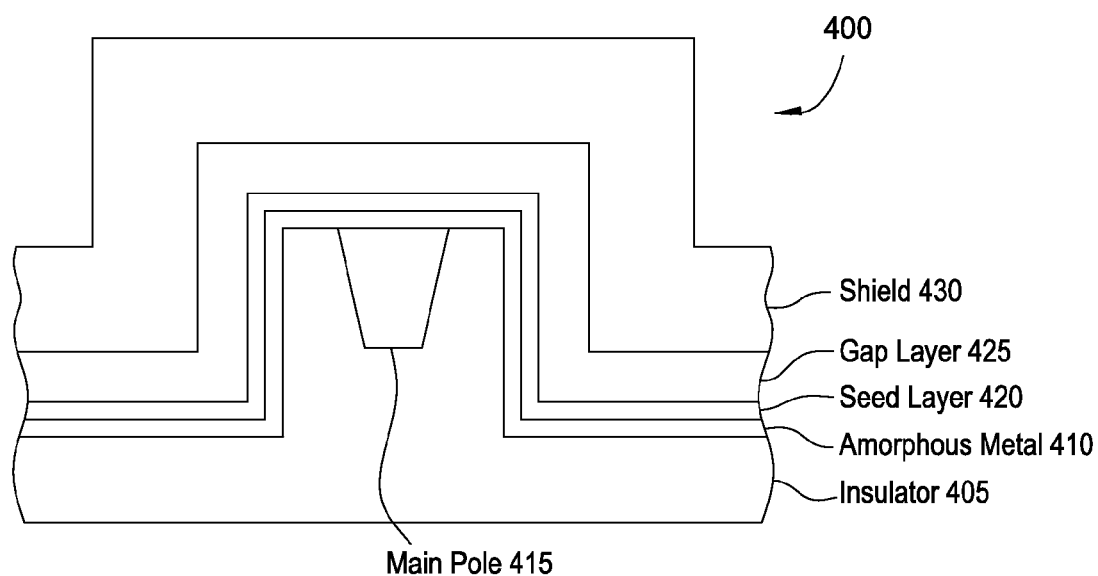

FIG. 4D Illustrates depositing a shield 430 onto the gap layer 425. In one embodiment, the shield 430 includes a magnetic material such as nickel-iron alloy, cobalt-iron alloy, cobalt-nickel-iron alloy, and combinations thereof. For example, the shield 430 may be made of the same material as the main pole 415. In FIG. 4D, the shield is located along three sides of the main pole 415, and thus, is a wrap-around shield (WAS). The thickness of the shield layer 430 may vary, but in one embodiment the thickness is greater than 100 nm.

Figure 5:
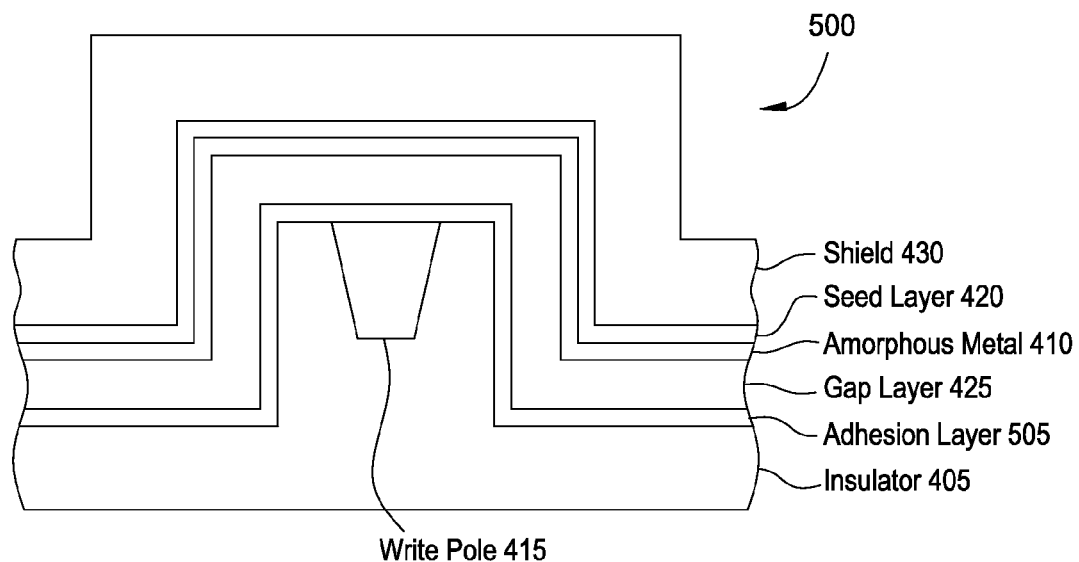
FIG. 5 illustrates a magnetic head with an amorphous metal layer between the main pole and shield, according to one embodiment described herein.

FIG. 5 illustrates a magnetic head 500 with an amorphous metal layer 410 between the main pole 415 and shield 430, according to one embodiment described herein. Like in head 400 shown in FIG. 4D, head 500 includes an amorphous metal layer 410 between the main pole 415 and shield 430. However, unlike in head 400, the amorphous metal layer 410 and seed layer 420 are deposited immediately below the shield layer 430. Because of the inertness of the non-magnetic materials of the gap layer 425, head 500 include an adhesion layer 505 between gap layer 425 and main pole 415. However, the material of the adhesion layer 505 may not have the deleterious effect shown in FIG. 3B when deposited directly on the material of the main pole 415. For example, the adhesion layer 505 may be Cr or Ta which may not cause the poor magnetic response shown in FIG. 3B.

The gap layer 425 and amorphous metal 410 are then deposited. Forming an amorphous material on the gap layer 425 prevents the crystalline structure of the adhesion and gap layers 405 and 425 from affecting later deposited layers. Stated differently, the amorphous metal 410 provides a substrate on which subsequent layers may be deposited without being affected by the crystalline structure of the layers below the amorphous metal 410. By using the metal 410 to provide an amorphous substrate, the seed layer 420 is able to have a crystalline structure unaffected by the crystalline structure of the underlying layers.

The crystalline structure of the seed layer 420 facilitates the growth of a high-moment shield layer 430 with soft properties. For example, the seed layer 420 may be NiCr which has the benefits described above. However, NiCr is only one example of a seed layer for directly growing a high-moment shield. One of ordinary skill will recognize the variety of seed materials that may be used to directly grow a high-moment shield layer 430 from an amorphous substrate.

In one embodiment, the amorphous layer 410 may be non-conductive (e.g., an insulator such as alumina or silicon dioxide). That is, if a system designer only wants an amorphous substrate on which to deposit the seed layer 420, then an insulative material may suffice as the amorphous layer 410. The disadvantages of using an insulative amorphous layer 410 are discussed in FIG. 7.

Figure 6:
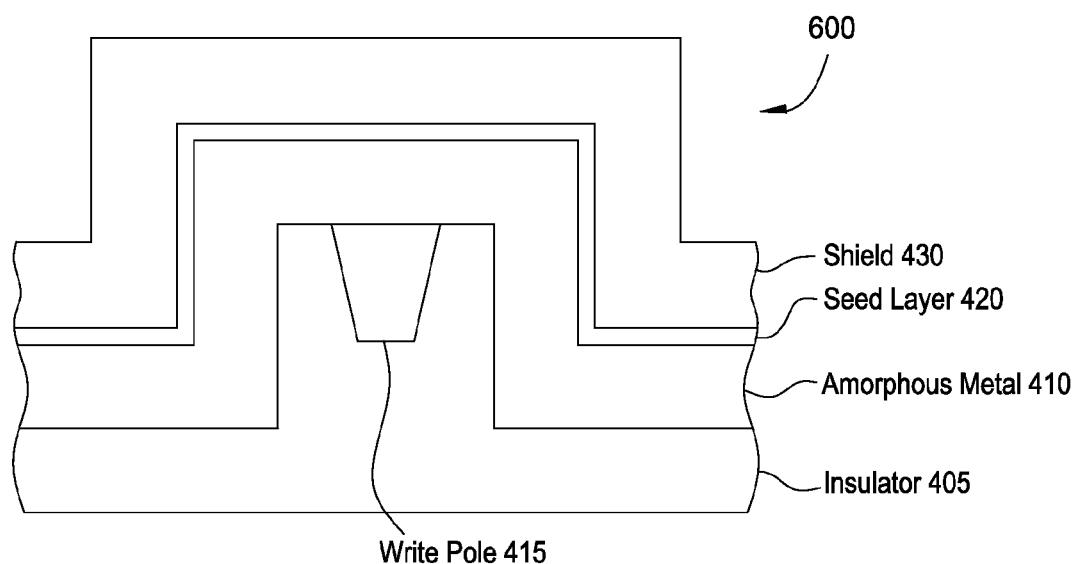
FIG. 6 illustrates a magnetic head with an amorphous metal layer between the main pole and shield, according to one embodiment described herein.

FIG. 6 illustrates a magnetic head 600 with an amorphous metal layer 410 between the main pole 415 and shield 430, according to one embodiment described herein. Here, head 600 uses the amorphous metal 410 as a gap layer—e.g., gap layer 425 shown in FIGS. 4D and 5. As such, the thickness of the amorphous metal layer 410 in FIG. 6 may be less than 100 nm while the thickness of the amorphous metal layer 410 in FIG. 5 may be less than 10 nm.

After depositing the amorphous metal 410, the seed layer 420 may then be deposited and used to facilitate the deposition of the shield layer 430 with the desired magnetic properties. Although NiCr is one example of a suitable seed layer material, any seed layer for growing a high-moment shield layer 430 is within the scope of this disclosure. Other thin seed layer examples such as NiFe, Ta/Ru, Ru, Cu. One of ordinary skill will recognize that other seed layer materials are feasible.

Figure 7:
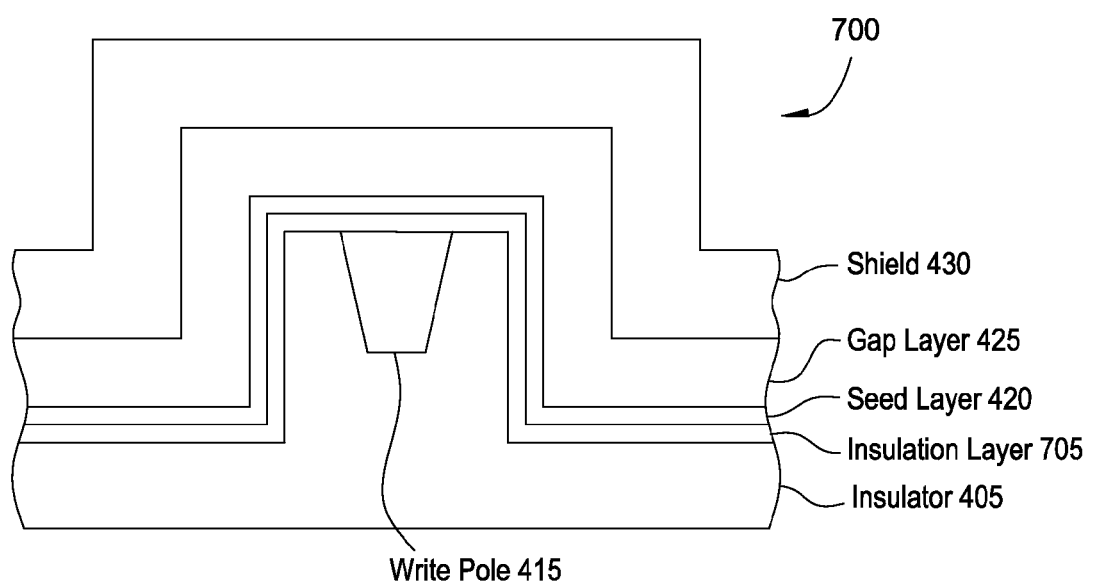
FIG. 7 illustrates a magnetic head with an insulation layer between the main pole and shield, according to one embodiment described herein.

FIG. 7 illustrates a magnetic head 700 with an amorphous insulation layer 705 between the main pole 415 and shield 430, according to one embodiment described herein. Head 700 illustrates depositing the amorphous insulation layer 705 between the write pole 415 and seed layer 420. The insulation layer 705 separates the write pole 415 from the seed layer 420 which may mitigate the poor magnetic response when the seed layer 420 is deposited on the write pole 415. Because the material of the insulator layer 705 is amorphous (e.g., alumina, silicon dioxide, and the like), the seed layer 420 is unaffected by the crystalline structure of the underlying layer. Thus, the natural crystalline structure of the seed layer 420 may then be used to dictate the crystal orientations of the subsequently formed gap and shield layers 425, 430.

In one embodiment, the seed, gap, and shield layers form a NiCr/Ru/CoFeNi stack with the advantages discussed previously. However, the seed layer 420 may be any reactive material that forms a suitable adhesion layer for coupling the gap layer 425 to the insulation layer 705. Moreover, in one embodiment, the seed layer 420 may be omitted where the material of the gap layer 425 sufficiently adheres to the insulation layer 705.

Although using the amorphous insulation layer 705 is a suitable alternative for using the amorphous metal layers shown in FIGS. 4-6, the insulation layer 705 may add cost to fabricating the head 700 relative to using an amorphous metal layer. Although not shown, head 700 may include circuit elements that were deposited previously. These circuit elements may have been deposited before depositing the write pole 415. The circuit elements may, however, need electrical connections to other layers in the head 700, through respective vias, that are deposited after depositing the shield layer 430. Accordingly, head 700 may include electrical paths that connect lower layers of head 700 to upper layers. Depositing the insulation layer 705, however, may block these electrical paths. Thus, in a separate fabrication step, holes in the insulation layer 705 may be opened so that these electrical paths may be maintained. Conversely, when using an amorphous conductive metal such as NiNb or NiTa, the electrical paths are maintained, and thus, the extra step of opening holes in the amorphous layer is unnecessary. The subsequent conductive layer of the head 700 may then be deposited on the amorphous layer to continue to form the electrical path between layers in head 700.

In one embodiment, the magnetic heads shown in FIGS. 5, 6, and 7 may be fabricated using the method shown in FIGS. 4A-4D where the various layer are formed sequentially using the main pole and insulator as a substrate.

While the foregoing is directed to embodiments of the present invention, other and further embodiments of the invention may be devised without departing from the basic scope thereof, and the scope thereof is determined by the claims that follow.

What is claimed is:

1. A magnetic head comprising:
   a write pole configured to perform perpendicular magnetic recording, wherein the write pole comprises a first side and a second side opposite the first side when viewed from an air bearing surface of the magnetic head, wherein the first side is longer than the second side;
   an amorphous metal layer comprising an electrically conductive material, wherein the amorphous metal layer surrounds the write pole on three sides of the write pole when viewed from the air bearing surface of the magnetic head, wherein the three sides include the first side; and
   a magnetic trailing shield, wherein the amorphous metal layer is between the trailing shield and the write pole.

2. The magnetic head of claim 1, further comprising:
   a seed layer directly on the amorphous metal layer, wherein the seed layer is between the amorphous metal layer and the trailing shield.

3. The magnetic head of claim 2, wherein the seed layer and the amorphous metal layer have thicknesses less than 20 nanometers.

4. The magnetic head of claim 2, wherein the seed layer comprises at least one of nickel, chromium, and tantalum and the trailing shield comprises at least one of cobalt, iron, and nickel.

5. The magnetic head of claim 2, further comprising,
   a gap layer comprising an inert, non-magnetic material, wherein the amorphous metal layer directly contacts the write pole, and the trailing shield directly contacts the gap layer.

6. The magnetic head of claim 1, wherein the trailing shield is a wrap around shield that surrounds the write pole on three sides as viewed from the air bearing surface of the magnetic head.

7. The magnetic head of claim 1, wherein the amorphous metal layer is at least one of nickel-niobium and nickel-tantalum.

8. A magnetic head, comprising:
   a write pole;
   an amorphous metal layer comprising an electrically conductive material, wherein the amorphous metal layer is in direct contact with the write pole, wherein the amorphous metal layer surrounds the write pole on three sides of the write pole when viewed from an air bearing surface of the magnetic head; and
   a magnetic trailing shield, wherein the amorphous metal layer is between the trailing shield and the write pole.

9. The magnetic head of claim 8, further comprising:
a seed layer directly on the amorphous metal layer, wherein the seed layer is between the amorphous metal layer and the trailing shield.

10. The magnetic head of claim 9, wherein the seed layer and the amorphous metal layer have thicknesses less than 20 nanometers.

11. The magnetic head of claim 9, wherein the seed layer comprises at least one of nickel, chromium, and tantalum and the trailing shield comprises at least one of cobalt, iron, and nickel.

12. The magnetic head of claim 9, further comprising,
a gap layer comprising an inert, non-magnetic material, wherein the trailing shield directly contacts the gap layer.

13. The magnetic head of claim 8, wherein the trailing shield is a wrap around shield that surrounds the write pole on three sides as viewed from the air bearing surface of the magnetic head.

14. The magnetic head of claim 8, wherein the amorphous metal layer is at least one of nickel-niobium and nickel-tantalum.

15. A magnetic head comprising:
a write pole, wherein the write pole comprises a first side and a second side opposite the first side when viewed from an air bearing surface of the magnetic head, wherein the first side is longer than the second side;
an amorphous metal layer comprising an electrically conductive material, wherein the amorphous metal layer surrounds the write pole on three sides of the write pole when viewed from the air bearing surface of the magnetic head, wherein the three sides include the first side, and wherein the amorphous metal layer is in direct contact with the first side of the write pole; and
a magnetic trailing shield, wherein the amorphous metal layer is between the trailing shield and the write pole.

16. The magnetic head of claim 15, further comprising:
a seed layer directly on the amorphous metal layer, wherein the seed layer is between the amorphous metal layer and the trailing shield.

17. The magnetic head of claim 16, wherein the seed layer comprises at least one of nickel, chromium, and tantalum and the shield layer comprises at least one of cobalt, iron, and nickel.

18. The magnetic head of claim 16, further comprising,
a gap layer comprising an inert, non-magnetic material, wherein the trailing shield directly contacts the gap layer.

19. The magnetic head of claim 15, wherein the trailing shield is a wrap around shield that surrounds the write pole on three sides as viewed from the air bearing surface of the magnetic head.

20. The magnetic head of claim 15, wherein the amorphous metal layer is at least one of nickel-niobium and nickel-tantalum.

* * * * *